May 11, 1965     B. K. SLONNEGER     3,183,383

THERMAL PROTECTOR FOR ELECTRICAL TRANSLATING DEVICES

Filed Oct. 25, 1961

Bruce K. Slonneger,
Inventor.
Koenig, Pope, Senniger and Powers,
Attorneys.

United States Patent Office 3,183,383
Patented May 11, 1965

3,183,383
THERMAL PROTECTOR FOR ELECTRICAL TRANSLATING DEVICES
Bruce K. Slonneger, Dayton, Ohio, assignor to Texas Instruments Incorporated, Dallas, Tex., a corporation of Delaware
Filed Oct. 25, 1961, Ser. No. 147,519
4 Claims. (Cl. 310—68)

This invention relates to thermal protectors for electrical translating devices, and more particularly to motor protectors.

Among the several objects of the invention may be noted the provision of a compact, inexpensive but reliable thermostatic switch which is placed in close heat-exchange relationship with electrical windings to be protected, whereby rapid protective responses are obtained; the provision of a protector of the class described which is not subject to being damaged or decalibrated during connection with the windings with which it is incorporated; and the provision of a protector of the class described which may have its thermostatic switch components conveniently replaced if they become damaged during use. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

Figure 1:
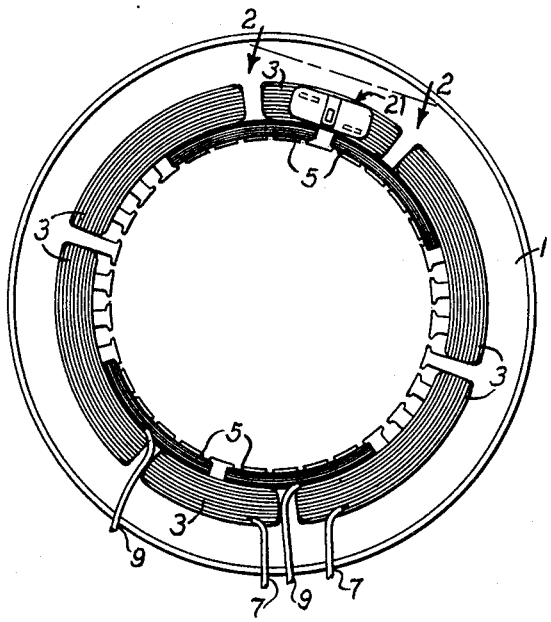
Figure 2:
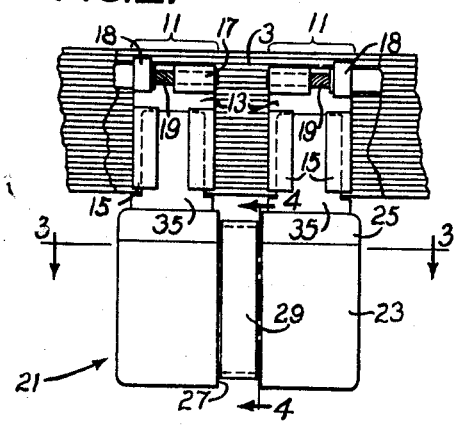
Figure 4:
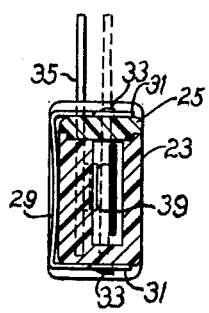
Figure 3:
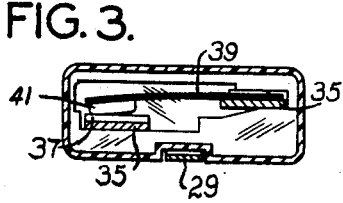
Figure 5:
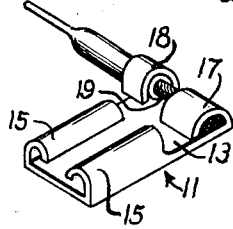

In the accompanying drawings, in which one of various possible embodiments of the invention is illustrated, FIG. 1 is an end view of a typical stator of a motor showing the invention applied to one of its run windings;

FIG. 2 is an enlarged fragmentary section taken on line 2—2 of FIG. 1, parts being broken away;

FIGS. 3 and 4 are cross sections taken on lines 3—3 and 4—4, respectively, of FIG. 2; and FIG. 5 is an isometric view of one socket element of a pair forming part of the invention.

Corresponding reference characters indicate corresponding parts throughout the several views of the drawings.

Various types of thermostatic elements have been proposed for placement next to the windings of electrical translating devices such as motors and the like, for the purpose of making rapid responses to overload heating. It is required that the thermostatic elements of such devices be of compact form so as to fit into the small spaces available, and preferably that they be of low cost. Such devices are readily subject to damage during coil construction if associated with a coil during such construction. Moreover, it has been required heretofore to make such devices to have an extremely long life because of the difficulty of replacement, particularly if buried or permanently attached to the coils. For example, it has sometimes been the practice when a protector in, say, a motor coil has become disabled during use to cut it out of the motor winding and with difficulty replace it; or to rejoin the coil terminals from which it has been cut, without making a replacement. In the latter event the motor was thereafter usable only as an unprotected device.

By means of the present invention, a small, low-cost protector may have comparatively undamageable parts intimately organized with windings during their manufacture, the remaining more-sensitive parts being thereafter applied and, moreover, being quick-detachable and replaceable after application. Then should a protector during service become disabled, a quick repair may be accomplished by simple replacement of a low-cost part or unit.

Referring now more particularly to the drawings, there is shown at numeral 1 a motor having so-called run windings 3 and start windings 5 which form its exciter means. The run winding terminals are shown at 7 and the start winding terminals are shown at 9. The rotor of the motor is not shown. One of the run windings 3 is shown in FIG. 2 as being the one selected for close organization therewith of the thermostatic protector elements. Such elements for example are constituted by a pair of right- and left-handed female pocket- or socket-forming metal plugging elements 11, both of which are shown in FIG. 2 and one of which is shown in FIG. 5.

Each socket element 11 is constituted by a substantially flat back plate 13 having bent-over contact margins 15 and wire-receiving terminal portions 17. The portions 17 form connections with end portions of winding terminals 19. Portions 18 are aligning members. Thus the pair of socket elements 11 form winding terminals adapted for reception in series-circuit relationship of a quick-detachable thermostatic U-shaped plug, indicated in general by the numeral 21. Each element 11 is nested or embedded in one of the windings 3. Embedding is effective for good heat transfer because of the flatwise shapes of the elements 11 above and below which loops of the windings 3 may be closely wrapped for effecting close contacts over substantial areas, as illustrated in FIG. 2. Heat collecting straps can be attached to socket elements 11 for faster heat transfer.

The plug is constituted by an insulating housing 23 having a cover 25 and a constricted waist portion 27 for the reception of a U-shaped spring clip 29 which, through suitable openings in its opposite legs 31, engages with lugs 33 on the housing 23 and the cover 25, to hold the cover in place. The housing forms the cross portion of a U-shape from which extend, as sides, two male plugging elements or tongues 35, adapted for plugging action within the margins 15 of the plates 13. These tongues are flat and terminate inside of the closed housing 23, as shown in FIG. 3. On one of them is located a contact 37 and to the other is attached one end of a cantilever bimetallic thermostatic element 39 in the form of a switch arm. At the outer end of the element 39 is attached a movable contact 41, adapted to engage and disengage with the contact 37. When the contacts are engaged, the circuit through the windings 3 is closed; when disengaged the circuit is open. Materials of the bimetallic element 39 are so selected and placed that, upon heating, the contact 41 recedes from the fixed contact 37 and, upon cooling, engagement is reestablished. The general form of the cantiliver switch arm 39, flat plugging elements 35, and of the housing 23, 25 is flat. All of these parts are generally in a plane. Thus the thermostatic unit 21 is of general flat U-shape, having flat sides adapted readily to be grasped for insertion to and removal from the female element 11 in the windings. The plugging tongues 35 may have narrow or flexible cross-sections at the points where they extend from cover 25 so stress caused by slight misalignment of male and female plugging elements will not be transmitted to thermal element 39.

All that is necessary during the construction of the motor windings 3 and 5 is to arrange the female socket-forming members 11 among a suitable portion of the windings to be protected and to connect them into such winding. A jig simulating the tongues 35 may be used during manufacture for holding the members 11 in proper position as the windings are constructed, so that after the stator has been completed they will have their openings properly spaced for receiving tongues 35 of the two-pronged thermostatic male plug 21. If it is desired to avoid the use of a jig, members such as 11 may be permanently related to one another by means of a common insulating support. The insulation carried on and about the wires of the windings 3 serves to maintain the female socket members 11 insulated from one another in the windings. If desired, these members 11 may carry their own insulation.

When plugged in, the thermostatic element 21 is in series-circuit relation with the windings 3 and the thermostatic switch arm 39 is in close heat-exchange relationship therewith. Since the element 21 is removable, it is not involved during assembly of the female members 11 in the motor windings 3. After the stator is finished it is required only that unit 21 be inserted. If, during the life of the motor, the thermostatic plug unit 21 should become damaged or otherwise inoperative, as by decalibration, repairs can be effected by readily replacing it with a new one. It is also apparent that thermostatic elements 21, of different thermostatic operating characteristics, may be interchanged.

The transverse, U-shaped relationship between the extent of the cantilever switch arm 39 and the extents of the male plugging elements 35 results in an arrangement wherein the heat-sensitive arm 39 is placed in closer heat-exchange relationship with its associated winding than would be the case wherein the switch arm extends outward for the winding. The flat form permits the detachable unit 21 to be conveniently grasped for manipulation.

Although the invention is organized in connection with the run windings 3 of the motor, it might alternatively be placed in connection with the start winding 5 or even with both, by having one of the female elements buried in one winding 3 and the other in one winding 5.

While the invention is disclosed with members 11 functioning as female plugging components on members 13, with the male plugging components on member 21, these may be reversed. While this inversion is possible, the arrangement shown wherein the female elements are in the windings is preferred because the device then has a more rapid response to heating conditions in the winding. In any event, since the invention permits the device to be manufactured in diminutive form, it has a more rapid response because its heat mass is thereby minimized. The thermal switch 21 can be arranged to carry either motor current or motor control current.

In view of the above, it will be seen that the several objects of the invention are achieved and other advantageous results attained.

As various changes could be made in the above constructions without departing from the scope of the invention, it is intended that all matter contained in the above description or shown in the accompanying drawings, shall be interpreted as illustrative and not in a limiting sense.

What is claimed is:

1. In combination, an electrical winding subject to heating, a pair of spaced conductive socket-forming members permanently embedded between loops in said winding, each of which members has an opening for access from the outside of the winding and being electrically connected with a portion of the winding to form winding terminal sockets in the winding, a plug removably connecting said terminal sockets into electrical series-circuit relation to one another in the winding, said plug comprising a housing, conductive plugging elements extending from the housing for insertion into and removal from said terminal sockets, said housing forming a hollow support for said plugging elements, and a thermostatic switch located in said housing and connecting said plugging elements.

2. In combination, an electrical winding subject to heating, a substantially parallel pair of spaced conductive socket-forming members permanently embedded between loops in said winding, each of which members has an opening for access from the outside of the winding and being electrically connected with a portion of the winding to form winding terminal sockets in the winding, a plug removably connecting said terminal sockets into electrical series-circuit relation with the winding, said plug comprising a housing, substantially parallel conductive plugging elements extending from the housing for insertion into said terminal sockets, said housing forming a hollow connection between said plugging elements, a bimetallic thermostatic switch blade lying in said housing and extending crosswise of said plugging elements, whereby the thermostatic switch blade may be placed in substantially close heat-exchange relationship with respect to said winding.

3. In combination, an electrical winding subject to heating, a substantially parallel pair of spaced conductive socket-forming members permanently embedded in said winding, each of which members has an opening for access from the outside of the winding and being electrically connected with terminal portions of the winding to form winding terminal sockets in the winding, a U-shaped plug removably connecting said terminal sockets into electrical series-circuit relation with the winding, said plug comprising a housing, substantially parallel conductive plugging elements extending parallel to one another from the housing for insertion into said terminal sockets, said housing forming a crosswise support between said plugging elements to form therewith said U-shape, a bimetallic thermostatic switch blade in said crosswise connection of the housing and also extending crosswise between portions of said plugging elements, whereby the blade lies in substantially close heat-exchange relationship with respect to said winding.

4. In combination, an electrical winding subject to heating, a pair of spaced conductive flatwise socket-forming members permanently embedded between loops of the winding, each of the members forming a substantially flatwise opening for access from the outside of the winding and being electrically connected with terminal portions of the winding to form winding terminal sockets in the winding, a U-shaped plug removably connecting said terminal sockets into electrical series-circuit relation with the winding, said plug comprising a housing, substantially flat conductive plugging elements extending parallel to one another from the housing for insertion into said flatwise terminal sockets, said housing forming a crosswise support between said plugging elements to form therewith said U-shape, a bimetallic thermostatic switch blade in said housing also extending crosswise between said plugging elements, whereby the blade lies in substantially close heat-exchange relationship with respect to said winding.

References Cited by the Examiner
UNITED STATES PATENTS

| 2,105,603 | 1/38 | Landis | 175—294 |
| 2,828,386 | 3/58 | Malone | 200—113 |
| 2,834,868 | 5/58 | Greene et al. | 200—136.5 |
| 2,882,371 | 4/59 | Bishofberger | 200—138 |
| 2,945,207 | 7/60 | Duks | 339—276 |

FOREIGN PATENTS

| 661,330 | 5/38 | Germany. |
| 724,829 | 3/39 | Germany. |
| 511,956 | 8/39 | Great Britain. |

BERNARD A. GILHEANY, *Primary Examiner.*